Sept. 1, 1931. G. I. WORLEY 1,821,196
TRACTOR ATTACHMENT FOR TRUCKS
Original Filed May 28, 1925 4 Sheets-Sheet 3
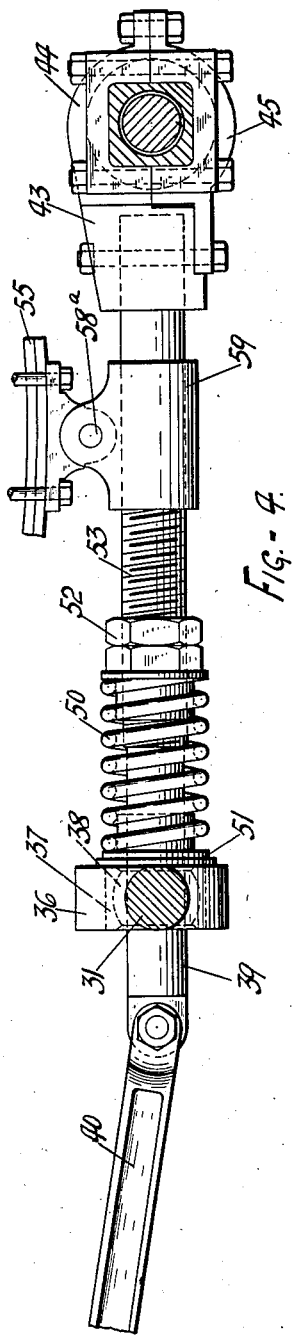
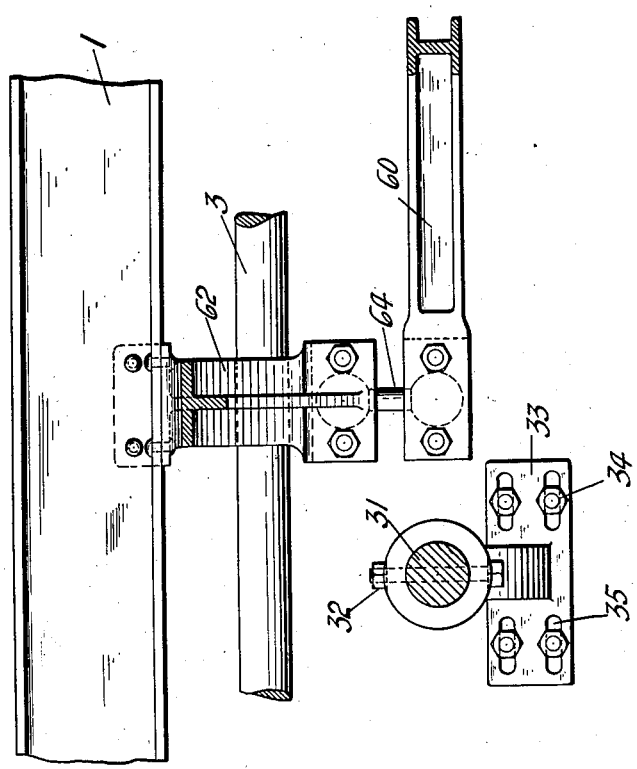
INVENTOR.
GEORGE I. WORLEY.
BY
ATTORNEY.

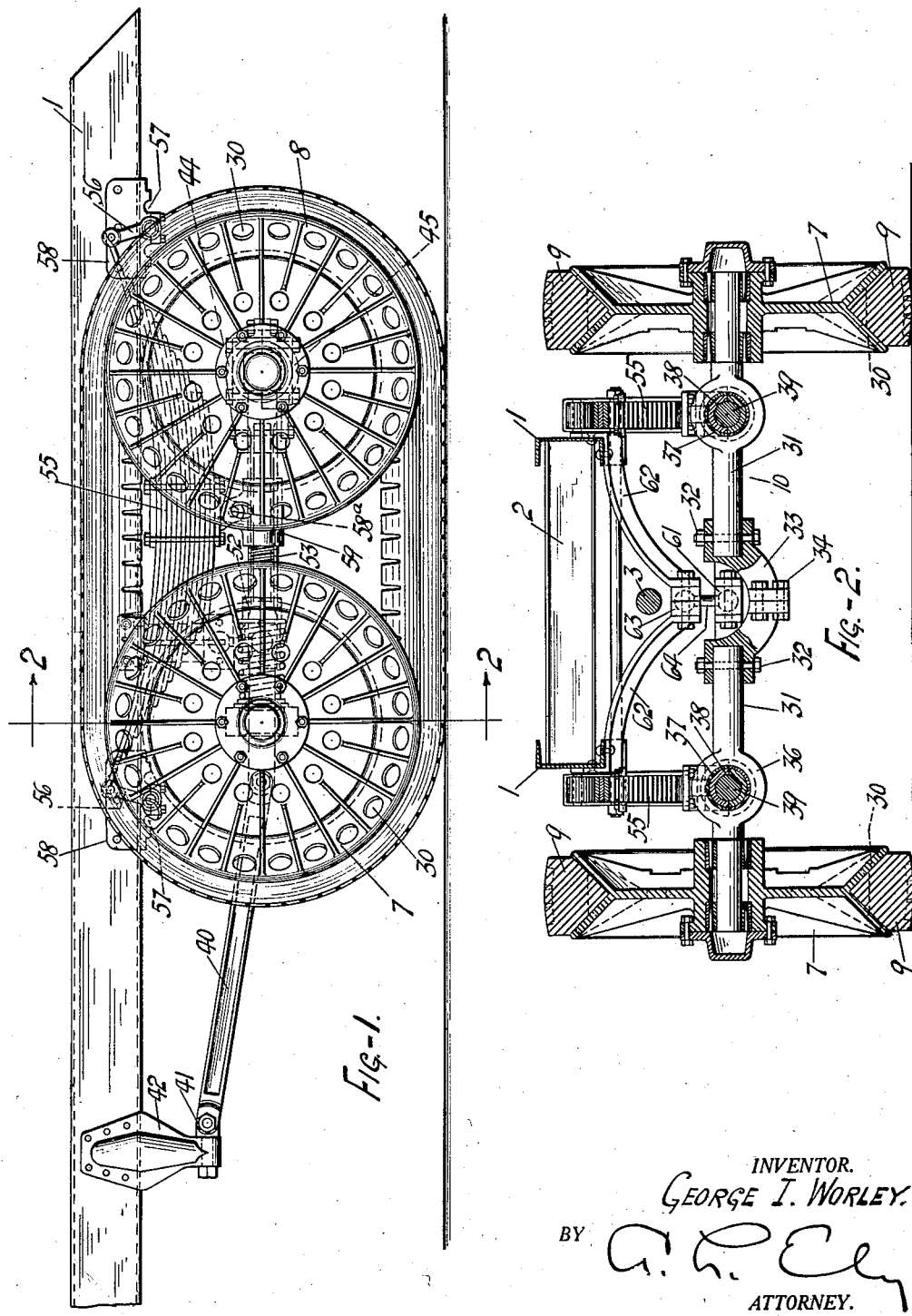

Sept. 1, 1931.  G. I. WORLEY  1,821,196
TRACTOR ATTACHMENT FOR TRUCKS
Original Filed May 28, 1925  4 Sheets-Sheet 4

INVENTOR.
GEORGE I. WORLEY.
BY
ATTORNEY.

Patented Sept. 1, 1931

1,821,196

UNITED STATES PATENT OFFICE

GEORGE I. WORLEY, OF WILLOUGHBY, OHIO, ASSIGNOR TO THE McNEIL BOILER COMPANY, OF AKRON, OHIO, A CORPORATION OF OHIO

TRACTOR ATTACHMENT FOR TRUCKS

Application filed May 28, 1925, Serial No. 33,433. Renewed August 19, 1929.

This invention relates to an attachment for trucks or other vehicles to adapt them for heavy hauling under all sorts of road conditions. In construction work of all kinds where excavating or filling is being done, the usual form of wheeled trucks do not operate satisfactorily due to the character of the surfaces over which they are required to run. For example, in excavating for roads, the trucks to haul the dirt from the steam shovels are required to go over the ground which has been excavated and to travel over fields, soft ground, and all kinds and conditions of soil and to climb embankments and hills, and to operate in all weathers and through mud and bogs. The ordinary wheeled truck, such as universally used at the present time, cannot travel the roads satisfactorily and are very inefficient.

The purpose of the present invention is to devise a form of tractor attachment for trucks which can be used in place of the wheels and which will operate more efficiently, going over ground in which a wheeled truck cannot travel.

The device shown herein has been used under the most difficult circumstances and has been able to carry heavy loads over roads and through locations which are impassable for wheeled vehicles, and it will be understood that while only one form of the invention is shown and described, other forms may be devised, departing therefrom but still embodying the principles of the invention as set forth herein.

In the drawings:

Figure 1 is a side elevation of the tractor attachment in assembled condition;

Figure 2 is a vertical transverse section on the line 2—2 of Figure 1;

Figure 4 is a side view of the member which is known herein as the "submember," the location of the figure being indicated by the line 4—4 of Figure 3;

Figure 5 is a section on the line 5—5 of Figure 3;

As will be observed from an inspection of the drawings, the device is adapted to be attached to a truck frame and embodies a pair of tractor belts which run upon the ground, each belt passing over two wheels carried by an extensible and flexible member which supports the truck body. The invention has to do with the structural features of the tractor attachment and the tire associated and combined therewith.

Figure 3:
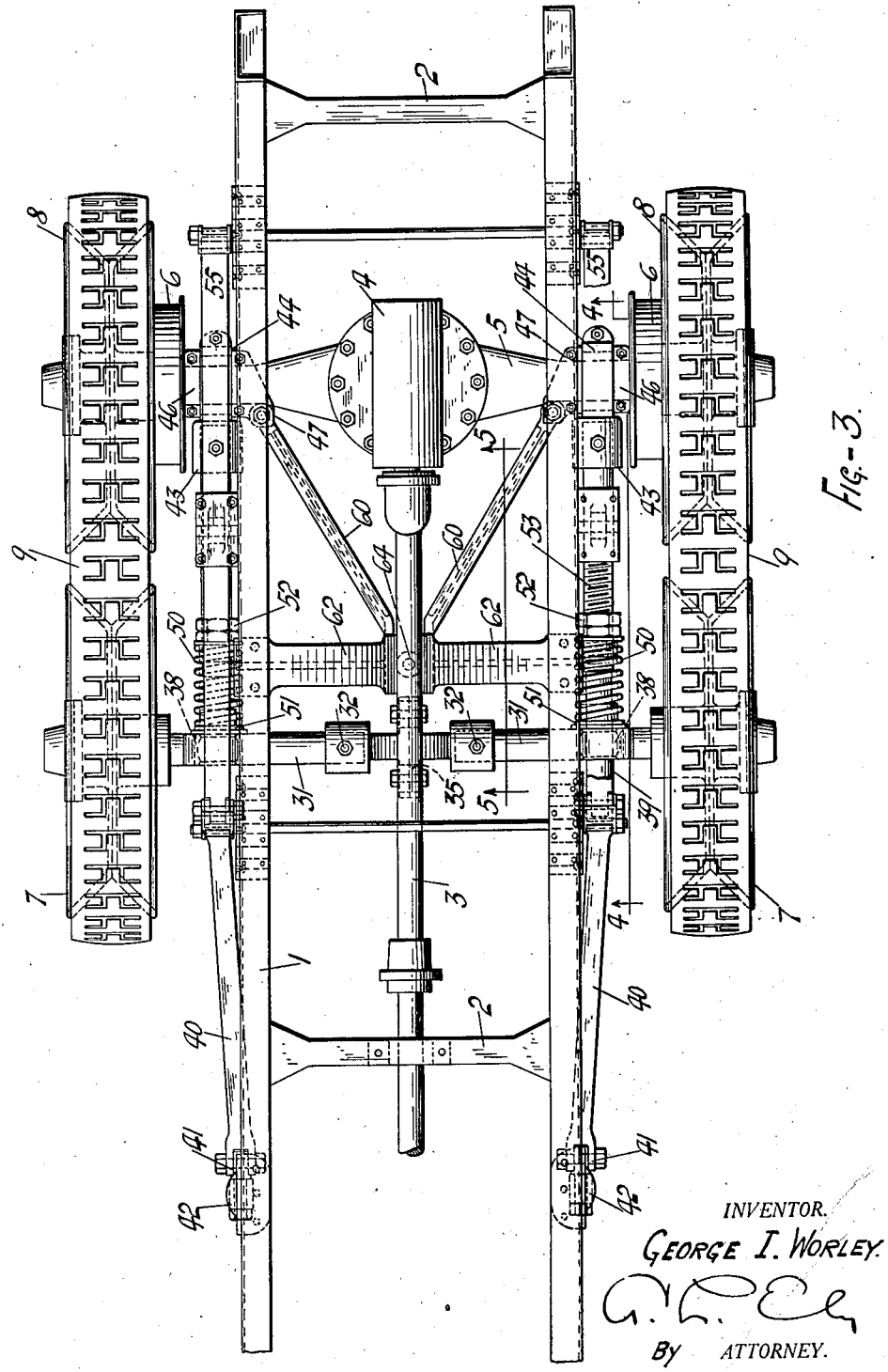
Figure 3 is a plan view, parts being omitted so as not to confuse the drawing.

In the drawings the framework of the truck body is shown by the parallel beams 1 and the cross members 2. The drive shaft is shown in Figure 3 at 3, the differential being indicated at 4 and the usual rear axle at 5 and the brake drums at 6, all of which are standard construction and are not altered or modified by the attachment of the tractor member.

The tractor attachment comprises two pairs of wheels, each pair comprising a front wheel 7 and a rear wheel 8 over which runs a flexible, elastic tractor belt or tire 9 which runs upon the ground and supports and drives the truck. The rear wheels 8 are driven, while the front wheels, in the construction shown in all of the figures except 8 and 9, are free to rotate upon the front or floating axle 10. In this construction the rear wheels operate as driving wheels, while the front wheels lay the tire down for the travel of the rear wheels.

Figures 8, 9:
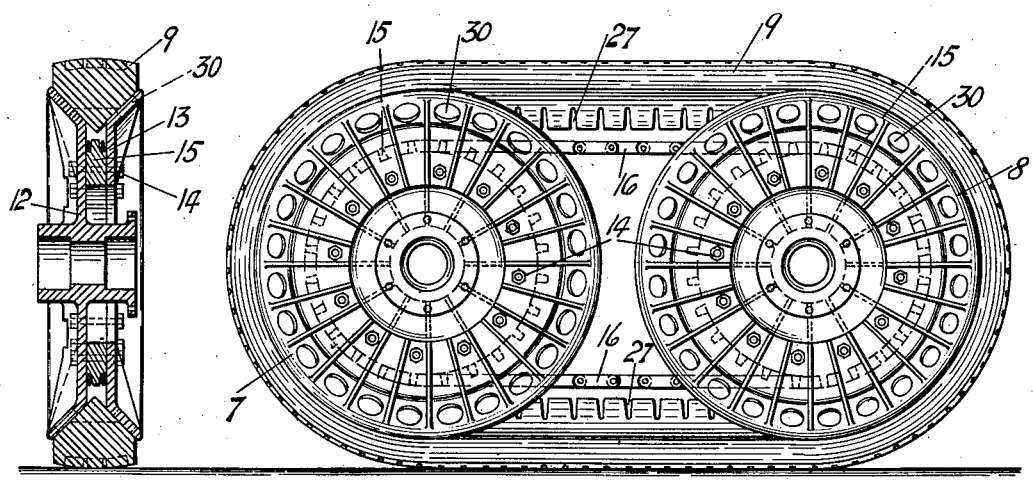
Figures 8 and 9 are similar views of a form of the traction belt which may be used if additional traction is desired.

Where, however, extremely bad road conditions or steep embankments are to be gone over, it may be advisable to drive the front wheels as well, and such a construction is shown in Figures 8 and 9 where the wheels, instead of being solid castings as shown in Figure 2, are made in two parts 12 and 13 secured together by bolts 14 and having sprockets 15 between the sections of the wheel within the tire over which travels a sprocket chain 16. With this construction both wheels are driven and there is no liability of slippage between the wheels and the belt.

Figure 6:
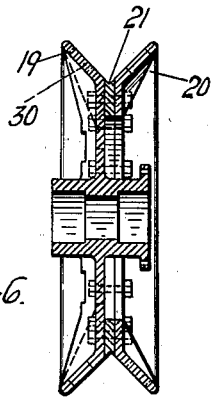
Figures 6 and 7 are a section and side view respectively of a modified form of wheel.
Figure 7:
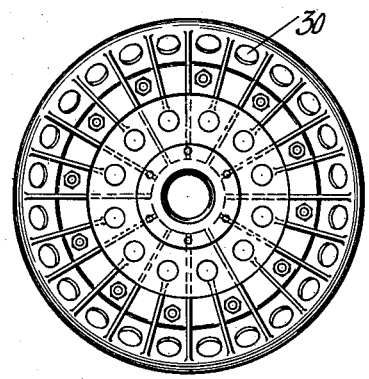

In the form shown in Figure 2, the wheel is cast integrally and is designed to receive one size of belt only, but if changes in size of belt are desired the wheel may be made in two halves 19 and 20, as shown in Figures 6 and 7, being spaced apart by ring-shaped fillers 21, changes in sizes of tires being accommodated by the substitution of fillers of different thickness, or by increasing the number of fillers.

Figure 10:
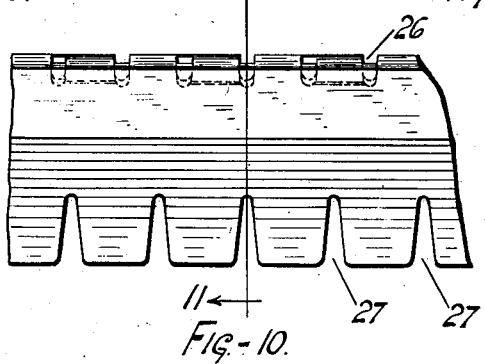
Figure 10 is a side view of a fragment of the tire.
Figure 11:
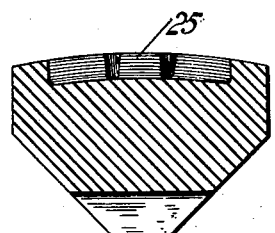
Figure 11 is a section of Figure 10 on the line 11.

Whichever of the three forms of wheel are used, the outer peripheries of the wheels are formed with grooves, the walls of which converge toward the central plane of the wheel so as to receive the traction belt 9 which is constructed in cross-section substantially triangular, the apex of the triangle being toward the center of the wheel or upon the upper side of that portion of the traction belt which rests upon the ground. This construction is clearly shown in Figures 10 and 11 in which the apex of the tire is indicated at 24 and the ground contacting portion at 25, the latter portion being molded with non-skid projections or formations 26. The inner periphery of the belt is provided with a plurality of transverse cuts or grooves 27 which extend within the body of the belt to a sufficient extent to permit the wrapping of the belt about the wheels.

For the belt, I prefer to use rubber of a tough resilient structure, such as ordinarily used in the treads of pneumatic tires, and this should be vulcanized as a complete, endless, integral belt without joint so that no weak area may be found therein. Experience has shown that an endless, homogeneous rubber belt of tough, practically non-stretchable rubber is highly satisfactory for this purpose without any reenforcing elements therein, what little stretch may occur being taken up by the mechanism as will be described, but if it should prove advantageous to incorporate any element within the belt for the purpose of rendering it non-stretchable or for other reasons, the invention is broad enough to cover such modification.

The triangular construction not only gives better frictional engagement with the grooved surfaces of the wheels, but also serves the highly advantageous function of shedding dirt or sand which would accumulate upon the surface of a flat belt and be compacted and built up between the wheels and the belt. These important advantages are further enhanced by forming a series of apertures or openings 30 in the side flanges of the wheels through which the dirt and sand is discharged and into which the rubber bulges to provide a cog-like driving action between the wheels and belt.

The rear wheels are mounted directly upon the rear axle 5 of the truck and the front wheels upon the floating or auxiliary axle 10. The floating axle 10 is composed of members 31 which are clamped by bolts 32 within sockets of a two-part yoke 33 which is U-shaped, as shown in Figure 2, the yoke halves being secured together by bolts 34 extending through slots 35, so that the two parts of the yoke may be adjusted relatively to one another. The purpose of this arrangement is to permit of adjustment of the two pairs of wheels relatively to one another should one of the belts be slightly longer than the other, due possibly to the replacement of a worn belt by a new belt upon one side of the tractor attachment.

The members 31 of the floating axle are each formed with an enlarged circular bearing 36 in which is received a split sleeve 37 rotatable with respect to the bearing 36, the sleeve being cored out to provide a spherical bearing 38 in which is slidably received the sub-member 39 which supports the truck body.

The sub-member 39 on each side of the machine extends from in front of the floating axle to a point adjacent the rear axle. At the front end the sub-member is pivotally connected to a link 40 which is connected by the universal joint 41 to the bracket 42 which is attached to the body 1. The link 40 serves as the member which propels the truck forward, receiving the thrust of the propelling mechanism through the sub-member. The sub-member is fastened at its rear end within a socket 43 formed within the upper half 44 of a two-part circular yoke, the other half of which is designated as 45. The yoke 44—45 is pivotally mounted upon the rear axle housing 5 between an outer collar 46 and an inner collar 47 which clamp on the square housing 5 and which have a circular peripheral portion journaling the circular yoke. The jointed construction of the sub-member and the link 40 and the pivotal and rotative connections at the ends permit a great freedom of movement for the front wheel so that the whole structure can rock about the rear axle in going over irregularities in the surface of the ground, and the ball and socket bearings for the front axle permit of relative movement of the tractor wheels at either side of the truck, and the swiveled connection 41 permits of twisting movement of the tractor unit.

It will be observed that each end of the floating axle is slidably mounted upon the sub-member, this construction being for the purpose of permitting a front wheel to be drawn toward the rear wheel by the tractor belt, a provision which is necessary because of the deflection of the belt upwardly between the wheels, as in passing over a rock or other abrupt projection in the ground. The wheels are held apart by means of a heavy coil spring 50 surrounding the sub-member and bearing against a washer 51 which, in turn, rests against the flange of the split sleeve 37. The other end of the spring is confined by lock nuts 52 screwed upon threaded portion 53 of the sub-member. The spring 50 keeps the traction band under a certain degree of tension and also permits of shortening of its effective length under deflection.

The truck is carried upon springs 55, the shackles 56 of which are fastened in recesses 57 on brackets 58 attached to the frame so that the location of the springs relative to the body can be adjusted. The springs are pivotally supported at 58ª upon sleeves 59 which are slidably mounted upon the sub-member, the arrangement permitting the adjustment of the body upon the traction device relatively to shift the load to the most advantageous position upon the sub-member.

The rolling torque, which tends to turn the whole device upon the rear axle, is prevented by a lower pair of converging torque arms 60 which are connected at their rear ends to the brackets 47 and at their front arms to a divided block 61, in conjunction with an upper pair of torque arms 62 which are fastened to the body of the truck at opposite sides thereof and bend downwardly, being fastened to a divided block 63 located above the block 61. The blocks 61 and 63 constitute sockets of a double ball and socket joint, the other portion of which is formed by a dumb-bell shaped connecting piece 64, the ends of which are provided with the balls received within the sockets.

The arms 60 and 62, therefore, constitute couples connected by the members 64 which resist the rolling torque and yet permit flexibility of the whole structure of the tractor member.

The apparatus herein shown and described is valuable for contractors who are required to haul material or equipment through difficult roads and over uneven and slippery ground. The claims are entitled to a full range of equivalents to cover modifications and changes within the scope of the invention.

What is claimed is:

1. In a tractor device for trucks or the like, front and rear wheels constituting a pair on either side of the truck, a rear axle for the truck, a sub-member supported upon the rear axle and upon the front wheels, a truck body support carried upon the sub-member between the wheels, a tractor belt over the wheels, and a torque preventing member comprising a couple connected to the rear axle and a couple connected to the truck body and a ball and socket joint between said couples.

2. In a tractor device for trucks or the like, front and rear wheels constituting a pair on either side of the truck, a rear axle for the truck, a sub-member supported upon the rear axle and upon the front wheels, a truck body support carried upon the sub-member between the wheels, a tractor belt over the wheels, and a torque preventing member comprising a couple connected to the rear axle and a couple connected to the truck body and a connecting member between the two couples having a compound ball and socket connection therewith.

3. In a tractor device for attachment to trucks, the combination with the truck body of a driven rear axle, a front axle, wheels upon the axles arranged in pairs on either side of the truck, a flexible tractor belt over the wheels of a pair, and flexible sub-members on either side of the device having rocking support upon the rear axle and sliding and rocking support upon the front axle.

4. In combination with a truck frame, a tractor unit comprising a pair of axles, one of said axles being stationary, wheels journaled at the ends thereof, spaced sub-members connecting said axles, one of said axles being slidably carried on said sub-members and yielding means positioning said slidable axle on said sub-members whereby said axles may have relative movement toward and from each other, sleeves adapted to slide on said sub-members, said sleeves being pivotally connected to the frame of the truck, links pivotally connecting one end of the sub-members to the frame, and additional strengthening means comprising a pair of radius rods flexibly connecting the ends of the stationary axle to the frame.

5. In combination with a truck frame a tractor unit comprising a pair of substantially parallel axles, one of said axles being stationary, wheels journaled at the ends thereof, spaced sub-members connecting said axles, sleeves on said sub-members, said sleeves being pivotally connected to the frame of the truck, links pivotally connecting one end of the sub-members to the frame, and additional strengthening means comprising a pair of radius rods flexibly connecting the ends of the stationary axle to the frame through the agency of a dumb-bell link, the ends of which are held in sockets on the frame and rods respectively.

6. In combination with a truck frame, a tractor unit comprising a pair of axles, wheels journaled at the ends thereof, spaced sub-members connecting said axles, one of said axles being slidably carried on said sub-members and yielding means positioning said slidable axle on said sub-members whereby said axles may have relative movement toward and from each other, said sliding axle being split transversely midway of its length, means connecting the ends of the split together, said means permitting one-half of the axle to be offset in parallel relation to the other half, sleeves adapted to slide on said sub-members, said sleeves being pivotally connected to the frame of the truck, links pivotally connecting one end of the sub-members to the frame, and additional strengthening means comprising a pair of radius rods flexibly connecting the ends of the stationary axle to the frame through the agency of a dumb-bell link, the ends of which are held in sockets on the frame and rods respectively.

7. In combination with a truck frame, a tractor unit comprising a pair of parallel axles, wheels journaled at the ends thereof, spaced sub-members connecting said axles, one of said axles being slidably carried on said sub-members and yielding means positioning said slidable axle on said sub-members whereby said axles may have relative movement toward and from each other, sleeves adapted to slide on said sub-members, said sleeves being pivotally connected to the frame of the truck, links pivotally connecting one end of the sub-members to the frame, said sliding axle being split transversely midway of its length, means connecting the ends of the split together, whereby one-half of the axle can be offset in parallel relation to the other half, and rubber traction belts running on each pair of wheels.

8. In combination with a truck frame, a tractor unit comprising a pair of parallel axles, wheels journaled at the ends thereof, spaced sub-members connecting said axles, sleeves on said sub-members, said sleeves being pivotally connected to the frame of the truck, links pivotally connecting one end of the sub-members to the frame, and additional strengthening means comprising a pair of radius rods flexibly connecting the ends of one of the axles to the frame, and rubber traction belts running on each pair of wheels.

9. In combination with a truck frame, a tractor unit comprising a pair of substantially parallel axles, wheels journaled at the ends thereof, spaced sub-members connecting said axles, one of said axles being slidably carried on said sub-members, the other of said axles being stationary with respect thereto, yielding means positioning said slidable axle on said sub-members whereby said axles may have relative movement toward and from each other, sleeves adapted to slide on said sub-members, said sleeves being pivotally connected to the frame of the truck, links pivotally connecting one end of the sub-members to the frame, and additional strengthening means comprising a pair of radius rods flexibly connecting the ends of the stationary axle to the frame through the agency of a dumb-bell link, the ends of which are held in sockets on the frame and rods respectively.

10. In combination in a tractor unit, comprising a pair of aligned wheels having deep, V-shaped, peripheral grooves, resilient means separating said wheels, the side walls of said grooves being pierced with relatively large apertures, and a rubber tractor tire carried by said wheels, said tire having a V-shaped inner periphery fitting in the V-shaped wheel grooves so that in operation of the resilient means to separate said wheels the rubber tire wedges down into the groove and swells out into the apertures therein whereby a cog-like drive is secured between the wheels and tire and whereby the contacting surfaces between the tire and wheel are kept substantially free of dirt as it is forced out of the apertures.

11. In combination in a tractor unit, a pair of tractor wheels in tandem, said wheels being formed with deep peripheral grooves of V-shape in radial section, means for resiliently urging said wheels apart, an endless belt of elastic material trained about said wheels, the said belt having a V-shaped portion fitting in said wheel grooves, and a tread portion surrounding the same, said V-shaped portion being notched at the inner periphery of the belt so as snugly to fit in said grooves in passing about said wheels, said wheels having apertures in the sides thereof whereby dirt will be expressed through said apertures and whereby the elastic material of the belt will be bulged into the apertures due to the action of said resilient means and the load applied to the belt to provide a cog-like driving action between the wheels and belt.

12. In combination in a tractor unit, a pair of tractor wheels in tandem, said wheels being formed with deep peripheral grooves of V-shape in radial section, an endless belt of elastic material trained about said wheels, the said belt having a V-shaped portion fitting in said wheel grooves, and a tread portion surrounding the same, said V-shaped portion being notched at the inner periphery of the belt so as snugly to fit in said grooves in passing about said wheels, said wheels having apertures in the sides thereof whereby dirt will be expressed through said apertures and whereby the elastic material of the belt will be bulged into the apertures by the load applied to the belt to provide a cog-like driving action between the wheels and belt.

GEORGE I. WORLEY.